Sept. 18, 1956 N. DUDCHIK 2,763,372
MEANS FOR SEPARATING A TWO-PHASE LIQUID
Filed Jan. 17, 1952
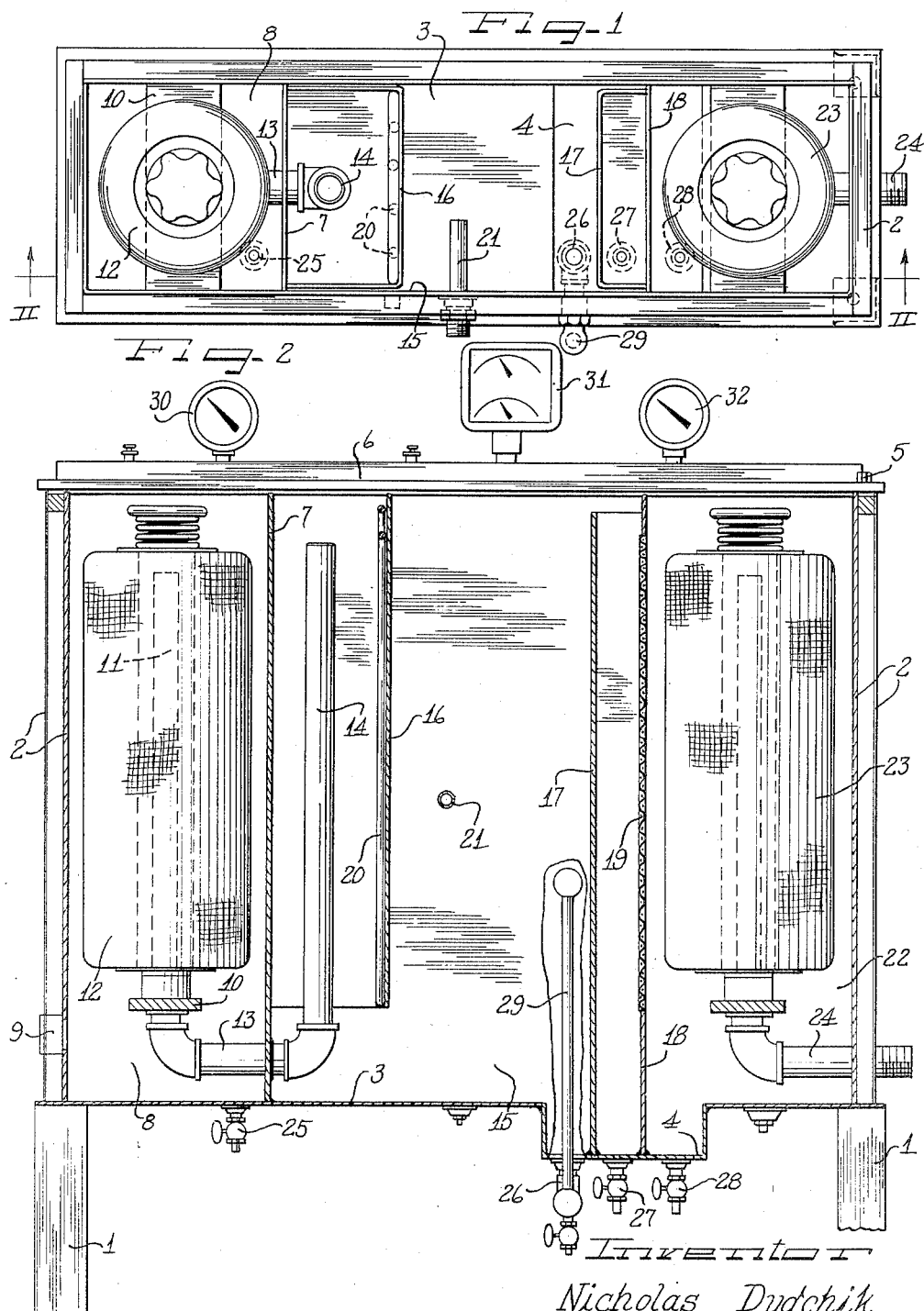
Inventor
Nicholas Dudchik United States Patent Office 2,763,372
Patented Sept. 18, 1956

2,763,372

MEANS FOR SEPARATING A TWO-PHASE LIQUID

Nicholas Dudchik, Lebanon, Ind., assignor to Indiana Commercial Filters Corporation, a corporation of Indiana Application January 17, 1952, Serial No. 266,902

1 Claim. (Cl. 210—45)

This invention relates to improvements in means for and method of separating a two-phase liquid, and is directed toward the separation of a heavier liquid from a lighter liquid, such for example as the separation of water from oil. The invention is highly desirable for use in connection with the purification and reconditioning of turbine lubricating oil, although the invention will have other uses and purposes as will be apparent to one skilled in the art.

In the past, many and various types of devices have been developed for the separation of a heavier liquid from a lighter liquid, and particularly to separate water from oil where the water is considered a contaminant, but in many cases these formerly known devices were objectionably expensive in construction, incorporated various moving parts likely to become out of order or create leakages, and were objectionably bulky. In most cases, these formerly known devices were not as efficient as desired in that while most of the heavier liquid would be removed from a two-phase liquid, there would still be minute traces of a definitely noticeable quantity of heavy liquid remaining after the separation process was completed.

With the foregoing in mind, it is an important object of the instant invention to provide a device for separating the heavier liquid from a two-phase liquid, which device is simple in construction, and contains no moving parts.

It is also an object of this invention to provide a separation device of the character set forth herein that is extremely efficient in operation, and will remove the heavier liquid from a two-phase liquid to substantially an absolute extent.

A further feature of the invention resides in the provision of a separation device of the character set forth herein, which effects the removal of a heavier liquid from a two-phase liquid in a plurality of different ways, including means to stimulate gravity separation, the screening out of the heavier liquid, and a final filtering to remove any minute traces of the heavier liquid yet remaining in the lighter liquid.

Also a feature of the invention resides in the provision of a separation device embodying a tank with baffle means therein forming a tortuous path of flow for a two-phase liquid to stimulate gravity separation of the heavier liquid, the liquid next passing through a screen of sufficient fineness to pass the lighter liquid, and restrain the heavier liquid.

A further feature of the instant invention is the provision of a separation device of the character set forth herein embodying a tank with a depressed sump at the region of greatest separation of the heavier liquid from the lighter liquid of a two-phase liquid, said sump being divided by partitions, with a drain cock for the heavier liquid associated with each division of the sump.

Another object of the invention resides in the provision of a device for not only separating a heavier liquid from a lighter liquid, but which also completely removes contaminants from the lighter liquid along with the heavier liquid.

Still another object of this invention resides in the provision of a separation device of the character set forth herein, embodying a tank having baffle means therein to provide a tortuous path of flow for the liquid, with heating elements carried by such baffle means to stimulate gravity separation.

It is also an object of this invention to provide a new and novel method of separating a heavier liquid from a lighter liquid.

While some of the more salient features, characteristics and advantages of the instant invention have been above pointed out, others will become apparent from the following disclosures, taken in conjunction with the accompanying drawing, in which—

Figure 1 is a top plan view of a separation device embodying principles of the instant invention, showing the same with the cover removed; and Figure 2 is a vertical sectional view of the separation device taken substantially as indicated by the line II—II of Fig. 1, looking in the direction of the arrows, with parts shown in elevation, and parts broken away.

As shown on the drawings:

The illustrated embodiment of the instant invention may be supported or mounted upon any suitable form of stand, frame, or legs as diagrammatically illustrated at 1 in Fig. 2. The invention itself includes a double walled tank 2, between the walls of which any suitable insulation may be provided, and which has a bottom 3 with a depressed portion 4 to form a sump below the normal bottom level in one location. Obviously the corner portions of the tank may be reinforced by angle irons or in any other desirable manner, and preferably suitable blocks are provided in the corners to accommodate fastening means such as a bolt 5 (Fig. 2) at periodic intervals by which a cover 6 may be secured over the tank, any suitable form of gasket means being provided to effect a tight seal between the tank and cover.

For purposes of convenience, the interior structure of the tank will be described in the direction of flow of the liquid passing through the tank. A solid transverse partition 7 forms a compartment 8 at one end of the tank into which a contaminated two-phase liquid may be forced under pressure through an inlet opening 9. Inside the compartment 8 a cross bar 10 supports a filter element which includes a center tube 11 on which is mounted a filtering cartridge 12, removable and replaceable when necessary. This cartridge 12 may be of any suitable character, depending upon the particular character of the two-phase liquid, and a cartridge packed or rolled with a mixture of cotton waste and redwood fiber is one satisfactory example. An outlet pipe 13 for filtrate extends from the center tube 11 through the partition 7, and upwardly as at 14 to a point near the top of the tank.

The next compartment 15 of the tank in which the upstanding pipe 14 is located is provided with a series of oppositely disposed baffles, there being two such baffles in the illustrated instance. A depending baffle 16 adjacent the pipe 14 terminates short of the bottom 3 of the tank so as to leave a passage beneath the baffle. As seen in Fig. 1, these baffles may be made of U shape for additional strength, if so desired. However, all such baffles are firmly secured in position as by welding, brazing or equivalently locking them to the casing wall or a partition as the case may be. Spaced away from the baffle 16 is an upstanding baffle 17 which terminates short of the top of the casing so as to leave a passage in that region. This baffle 17 extends down inside the sump 4, so as to divide off a portion of this sump. Adjacent the baffle 17 is a partition 18, also extending to the bottom of the sump, and imperforate in its lower portion.

In the upper portion thereof, the baffle 18 is cut away to provide a relatively large opening which is covered by a screen 19, welded or equivalently secured to the baffle itself. This screen 19 is preferably Dutch weave Monel metal of a mesh sufficiently fine to pass the lighter liquid, but restrain the heavier liquid. In this regard, it may be mentioned that a 496 mesh screen is satisfactory for the separation of water from lubricating oil. The baffle 18 and screen 19 close off the opposite end of the compartment 15.

Also located within the compartment 15 is an electrical heating unit 20 and this unit may effectively be carried by the baffle 16 as illustrated. The heating unit is controlled by a thermostat 21 of any suitable kind so as to maintain the temperature of the liquid in the compartment 15 at a predetermined degree, and again it may be mentioned that for the separation of water from lubricating oil, 140° F. is satisfactory.

In the final compartment 22 of the tank, a filter element or unit 23 of the same general character as the cartridge unit 12 is similarly mounted. In this case, however, the cartridge is of such character as to remove any final traces of the heavier liquid remaining in the lighter liquid. For example, in the case of mineral oil, or oil without additives, the cartridge may contain an earth filter medium, such as fuller's earth, infusorial or diatomaceous earth, kieselguhr, or the like. Should the oil contain additive, however, which may be removed unintentionally by the earth, a cartridge similar to the cartridge 12 would preferably be used. An outlet pipe 24 leads from the filter 23 through the casing and may be connected to any satisfactory pipe means leading back to the turbine or other instrumentality where the now remaining lighter liquid is utilized.

Along the bottom of the tank a series of drain cocks are provided, including a cock 25 for the first compartment 8, and a series of three drain cocks 26, 27 and 28, for the three sections of the sump 4. Since it is important that the heavier liquid separated from the two-phase liquid by gravity in the compartment 15 does not reach too great a height, a water glass 29 or the equivalent is associated with the drain cock 26 externally of the tank.

Since the liquid passing through the tank must be maintained under pressure to pass through the respective filters, suitable gauges may be provided in the cover of the tank, such as a pressure gauge 30 for compartment 8; a combined pressure and temperature gauge 31 for the compartment 15; and a pressure gauge 32 for the final compartment 22.

At this point, it may well be pointed out that the tank may consist only of a single compartment, such as the compartment 15 and a portion of the compartment 22, if so desired, the filters 12 and 23 being mounted in separate tanks or casings in the near vicinity. The arrangement illustrated, however, is more convenient and more economical.

By way of example, but not by way of limitation, the operation of the instant invention will be described as removing water from lubricating oil. It will be understood that the two-phase liquid passes slowly through the tank 2, sometimes as high as 15 minutes being required for the liquid to pass from the inlet 9 to the point where oil exits through the outlet 24.

Upon entering the compartment 8, the two-phase liquid passes through the filter cartridge 12, and the filtrate then leaves through the pipe 13 and enters near the top of the compartment 15 through the pipe stand 14. Should any water separate from the oil by gravity in compartment 8, that water may be eliminated through drain cock 25. In compartment 15, the two-phase liquid is subjected to a rise in temperature by means of the heating element 20, descends inside the baffle 16, passes underneath the same and upwardly over the top of the baffle 17. During this portion of its travel through the tortuous path, a part of the heavier liquid or water will separate by gravity and enter the first section of the sump 4, wherefrom it may be removed through the stop cock 26. After passing over the baffle 17, the remainder of the two-phase liquid goes through the screen 19 and here substantially all the water still remaining in the oil will be removed, descending into the middle compartment of the sump wherefrom it may be eliminated through the drain cock 27. Should any water particles be passed through the screen 19, such water will not leave the screen but will gravitate downwardly over its surface and collect in the third compartment of the sump 4, from which any water or sediment accumulating over a period of time may be eliminated by drain cock 28. The substantially pure oil then in compartment 22 of the tank must pass through the filter cartridge 23 and exit back to the apparatus where it is utilized. Should any traces of water still remain in that oil, it will be removed by the filter cartridge 23 before it leaves the tank and only pure oil is permitted to exit from the apparatus. Obviously, any fine impurities carried by the oil will be eliminated by the filters 12 and 23 and the screen 19.

My novel process of separating a heavier liquid from a lighter liquid is believed to be sufficiently clear from the foregoing as to warrant no further explanation herein.

From the foregoing, it is apparent that I have provided a highly efficient, simple operating, and economical device for separating heavier liquid from the lighter liquid. It will be especially noted that the device has no moving parts and effects the desired separation in a plurality of different ways.

It will be understood that modifications and variations may be effected without departing from the scope of the novel concepts of the present invention.

I claim as my invention:

In apparatus for the separation of a heavier liquid from a lighter liquid, a tank, a depending baffle terminating short of the tank bottom, an upstanding baffle spaced from the depending baffle and terminating short of the tank top, a partition adjacent said upstanding baffle having an imperforate bottom part and a screen upper portion, said screen being of sufficient fineness to pass the lighter liquid and restrain the heavier liquid, said tank having a depressed sump, said upstanding baffle and said partition dividing said sump into separate divisions, and a drain cock in each sump division.

References Cited in the file of this patent

UNITED STATES PATENTS

| Number | Name | Date |
|---|---|---|
| 18,315 | Kimball | Sept. 29, 1857 |
| 507,774 | Ball | Oct. 31, 1893 |
| 691,835 | Wyman | Jan. 28, 1902 |
| 911,388 | Franke | Feb. 2, 1909 |
| 1,017,100 | Jones | Feb. 13, 1912 |
| 1,035,653 | Stubbe | Aug. 13, 1912 |
| 1,108,037 | Warden | Aug. 18, 1914 |
| 1,155,914 | Grove | Oct. 5, 1915 |
| 1,221,376 | Rasmussen | Apr. 3, 1917 |
| 1,367,783 | Krumwiede | Feb. 8, 1921 |
| 1,372,880 | Hills | Mar. 29, 1921 |
| 1,641,843 | Fisher | Sept. 6, 1927 |
| 1,820,974 | Hills | Sept. 1, 1935 |
| 2,073,847 | Miller | Mar. 16, 1937 |
| 2,140,513 | Cline | Dec. 20, 1938 |
| 2,388,636 | Harvnot | Nov. 6, 1945 |